United States Patent
Thompson et al.

(10) Patent No.: US 10,658,919 B1
(45) Date of Patent: May 19, 2020

(54) HARMONIC REGULATOR WITH LOOP DELAY COMPENSATION

(71) Applicant: Hamilton Sundstrand Corporation, Charlotte, NC (US)

(72) Inventors: Ernest Thompson, Janesville, WI (US); Adam Michael White, Cherry Valley, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/283,874

(22) Filed: Feb. 25, 2019

(51) Int. Cl.
| | |
|---|---|
| *H02M 1/12* | (2006.01) |
| *H02M 1/00* | (2006.01) |
| *H02M 1/14* | (2006.01) |
| *H02M 1/15* | (2006.01) |
| *G05F 1/46* | (2006.01) |

(52) U.S. Cl.
CPC .......... *H02M 1/12* (2013.01); *G05F 1/467* (2013.01); *H02M 1/14* (2013.01); *H02M 1/15* (2013.01); *H02M 2001/0038* (2013.01)

(58) Field of Classification Search
CPC ........... G05F 1/467; H02M 1/12; H02M 1/14; H02M 1/15; H04B 15/005
USPC ........................................ 363/39, 40, 45, 46
See application file for complete search history.

(56) References Cited

U.S. PATENT DOCUMENTS

| | | | | |
|---|---|---|---|---|
| 6,472,775 B1 * | 10/2002 | Huang | ..................... | H02J 3/01 307/105 |
| 6,756,702 B1 | 6/2004 | Kalman et al. | | |
| 6,977,827 B2 * | 12/2005 | Gritter | ..................... | H02M 1/12 323/207 |
| 7,099,165 B1 * | 8/2006 | Rozman | .................. | H02M 1/12 363/39 |
| 8,629,579 B2 * | 1/2014 | Shen | ....................... | H02M 7/49 307/105 |
| 9,843,266 B2 | 12/2017 | Alahuhtala et al. | | |
| 9,876,599 B2 * | 1/2018 | Ross | ..................... | H04J 3/0602 |
| 2010/0157638 A1 * | 6/2010 | Naiknaware | ........ | H02M 7/4807 363/131 |
| 2011/0292699 A1 * | 12/2011 | Goerke | ................... | H02M 1/15 363/84 |

(Continued)

FOREIGN PATENT DOCUMENTS

| | | |
|---|---|---|
| CA | 2767709 A1 | 8/2012 |
| WO | 2013004133 A1 | 1/2013 |

OTHER PUBLICATIONS

Chang et al., "A Novel Control of Series Active Power Filter without Harmonics Detection", Power Electronics Specialists Confernce, Jun. 17, 2007, pp. 1112-1115.

(Continued)

*Primary Examiner* — Gary A Nash
(74) *Attorney, Agent, or Firm* — Cantor Colburn LLP (57) ABSTRACT

Embodiments of the invention provide for a system, method, and controller for operating a harmonic regulator with loop delay compensation. Some embodiments include receiving, at a controller, voltage feedback from a power system, and applying a harmonic regulator to each distortion frequency to be compensated. Embodiments also include applying a predetermined delay to an output of the harmonic regulator, scaling the delayed output and adding it to a power source voltage reference waveform, and providing condition power to a load, using the conditioned power source voltage reference waveform.

20 Claims, 9 Drawing Sheets

(56) References Cited

U.S. PATENT DOCUMENTS

| | | | | |
|---|---|---|---|---|
| 2013/0033907 A1* | 2/2013 | Zhou | ............ | H02M 1/12 |
| | | | | 363/37 |
| 2014/0292401 A1* | 10/2014 | Shen | ............ | H03H 11/1217 |
| | | | | 327/556 |
| 2014/0369092 A1* | 12/2014 | Nguyen | ............ | H02M 1/4233 |
| | | | | 363/45 |
| 2016/0226425 A1* | 8/2016 | Kawashima | ............ | H02J 3/01 |
| 2016/0349717 A1 | 12/2016 | Tadano | | |
| 2017/0179718 A1 | 6/2017 | Murakami et al. | | |

OTHER PUBLICATIONS

Chen et al., "Accurate and Fast Harmonic Detection Based on the Gemeralized Trigonometric Function Delayed Cancellation" IEEE Access, vol. 7, Jan. 1, 2019, pp. 3438-3447.

Exteneded European Search Report for Application No. 19215800. 4-1202 dated Feb. 27, 2020; 11 pages.

Hausmann et al., "Harmonic compensation in a load emulation system using different control techniques" Telecommunications Energy Conference, 2012 IEEE 34th International, IEEE, Sep. 20, 2012, pp. 1-7.

Yang et al., "Voltage Feeforward Control with Time-Delay Compensation for Grid-Connected Converters", Journal of Power Electronics, vol. 16, No. 5, Sep. 20, 2016, pp. 1833-1842.

* cited by examiner

FIG. 8

HARMONIC REGULATOR WITH LOOP DELAY COMPENSATION

BACKGROUND

The present invention generally relates to power quality, and more specifically to methods of controlling a power source to reduce voltage waveform distortion.

The quality of power delivered to electrical loads is critical for their proper operation. The quality of power delivered to electrical loads can be measured by how closely the applied voltage waveform resembles a desired, ideal, waveform shape. For alternating current (AC) power systems, the ideal waveform shape is a sine wave at a single (fundamental) frequency. Deviation from the ideal waveform shape is referred to as distortion. Typically, distortion is comprised of undesired frequency components that occur at multiples of the fundamental frequency; these frequencies are otherwise known as harmonics.

BRIEF DESCRIPTION

According to an embodiment, a system implementing a harmonic regulator with loop delay compensation includes a power system, and a controller coupled to the power system, wherein the controller is coupled to the power system. The controller further includes a harmonic regulator configured to remove distortion from power provided by the power system, and a delay component configured to add delay to the power from the power system, wherein an output of the controller is provided to a load and provided as feedback to an input of the controller.

In addition to one or more of the features described herein, or as an alternative, further embodiments include a delay component that is coupled to an input of the harmonic regulator.

In addition to one or more of the features described herein, or as an alternative, further embodiments include a delay component that is coupled to an output of the harmonic regulator.

In addition to one or more of the features described herein, or as an alternative, further embodiments include a delay component that is based at least in part on an integer number of sample delays in discrete time based on the control frequency.

In addition to one or more of the features described herein, or as an alternative, further embodiments include harmonic regulators that include a plurality of harmonic regulators and the delay components include a plurality of delay components, wherein the plurality of harmonic regulators are coupled to a corresponding a delay component of the plurality of delay components.

In addition to one or more of the features described herein, or as an alternative, further embodiments include independently selecting gain parameter for the harmonic regulator.

In addition to one or more of the features described herein, or as an alternative, further embodiments include a delay component that is coupled to a plurality of harmonic regulators.

According to another embodiment, a method for implementing a harmonic regulator with loop delay compensation is provided. The computer-implemented method includes receiving, at a controller, voltage feedback from a power system and applying a harmonic regulator to each distortion frequency to be compensated. The computer-implemented method also includes applying a predetermined delay to an output of the harmonic regulator, scaling the delayed output and adding it to a power source voltage reference waveform, and providing condition power to a load, using the conditioned power source voltage reference waveform.

In addition to one or more of the features described herein, or as an alternative, further embodiments include a pre-determined delay component that is coupled to an input of the harmonic regulator.

In addition to one or more of the features described herein, or as an alternative, further embodiments include a pre-determined delay component that is coupled to an output of the harmonic regulator.

In addition to one or more of the features described herein, or as an alternative, further embodiments include a pre-determined delay component that is based at least in part on an integer number of sample delays in discrete time based on the control frequency.

In addition to one or more of the features described herein, or as an alternative, further embodiments include a harmonic regulator that includes a plurality of harmonic regulators and the delay components include a plurality of delay components, wherein the plurality of harmonic regulators are coupled to a corresponding delay component of the plurality of delay components.

In addition to one or more of the features described herein, or as an alternative, further embodiments include individually selecting a gain for each harmonic regulator.

In addition to one or more of the features described herein, or as an alternative, further embodiments include a pre-determined delay component that is coupled to a plurality of harmonic regulators.

According to another embodiment, a controller for implementing a harmonic regulator with loop delay compensation is provided. The controller is coupled to a power system, wherein the controller is coupled to the power system and further includes a harmonic regulator configured to remove distortion from power provided by the power system, and a delay component configured to add delay to the power from the power system, wherein an output of the controller is provided to a load and provided as feedback to an input of the controller.

In addition to one or more of the features described herein, or as an alternative, further embodiments include a delay component that is coupled to an input of the harmonic regulator.

In addition to one or more of the features described herein, or as an alternative, further embodiments include a delay component that is coupled to an output of the harmonic regulator.

In addition to one or more of the features described herein, or as an alternative, further embodiments include a delay component that is based at least in part on an integer number of sample delays in discrete time based on the control frequency.

In addition to one or more of the features described herein, or as an alternative, further embodiments include harmonic regulators that include a plurality of harmonic regulators and the delay components include a plurality of delay components, wherein the plurality of harmonic regulators are coupled to a corresponding a delay component of the plurality of delay components.

In addition to one or more of the features described herein, or as an alternative, further embodiments include a delay component is coupled to a plurality of harmonic regulators.

Technical effects of embodiments of the present disclosure include incorporating plant delay compensation to enable control and reduction of harmonic distortion at frequencies which otherwise could not be controlled with a harmonic regulator alone.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Various electrical loads have different impacts on system power quality. These electrical loads can be classified as either linear or non-linear.

Inductive, resistive and capacitive loads are classified as linear loads, since they produce current flow at a given frequency proportional to the applied voltage at that frequency. When provided ideal (non-distorted) AC voltage, ideal current will flow in a linear load.

Some electrical loads, however, are non-linear, such as diode rectifiers. In non-linear loads, current flow is not always proportional to the applied voltage. In these loads harmonic currents may flow even when no voltage harmonics are applied.

Non-linear load current causes distortion in the voltage dropped across any source impedance between the electrical load and the source. Voltage delivered at a load is the sum of the source voltage and the voltage drop across the source impedance. Consequently, an ideal voltage source will still produce distorted voltage at electrical loads, if one of the loads is non-linear and causing a distorted source impedance voltage drop.

A conventional technique for reducing distortion in the voltage delivered to loads in the presence of non-linear loads is to reduce the source impedance (and thus the distorted voltage drop across the source impedance). This method is effective, however to reduce source impedance the power source electrical power rating must typically be increased. This results in the electrical power source (e.g. generator or solid-state power converter) having a larger physical volume and weight than would otherwise be necessary. Thus, there is a need in the art for alternate methods of reducing distortion in the voltage delivered to loads when non-linear loads are present which do not require increasing ratings of electrical power sources. The present disclosure provides a solution for this need.

An example non-linear load is a 6-pulse rectifier with load current total harmonic distortion (THD) greater than 25%. The highly distorted current will cause a distorted voltage drop across the source inductance of the aircraft power source (generator or VSCF converter) resulting in large voltage distortion on the aircraft electrical power buses. Other aircraft electrical devices may not have been designed for operation with the distorted voltage created by the non-linear load. This is a systems power quality problem; the combined design of the electrical power source and the distortion-causing loads determine resultant power quality, and neighboring loads must be designed for operation at that power quality.

Figure 1:
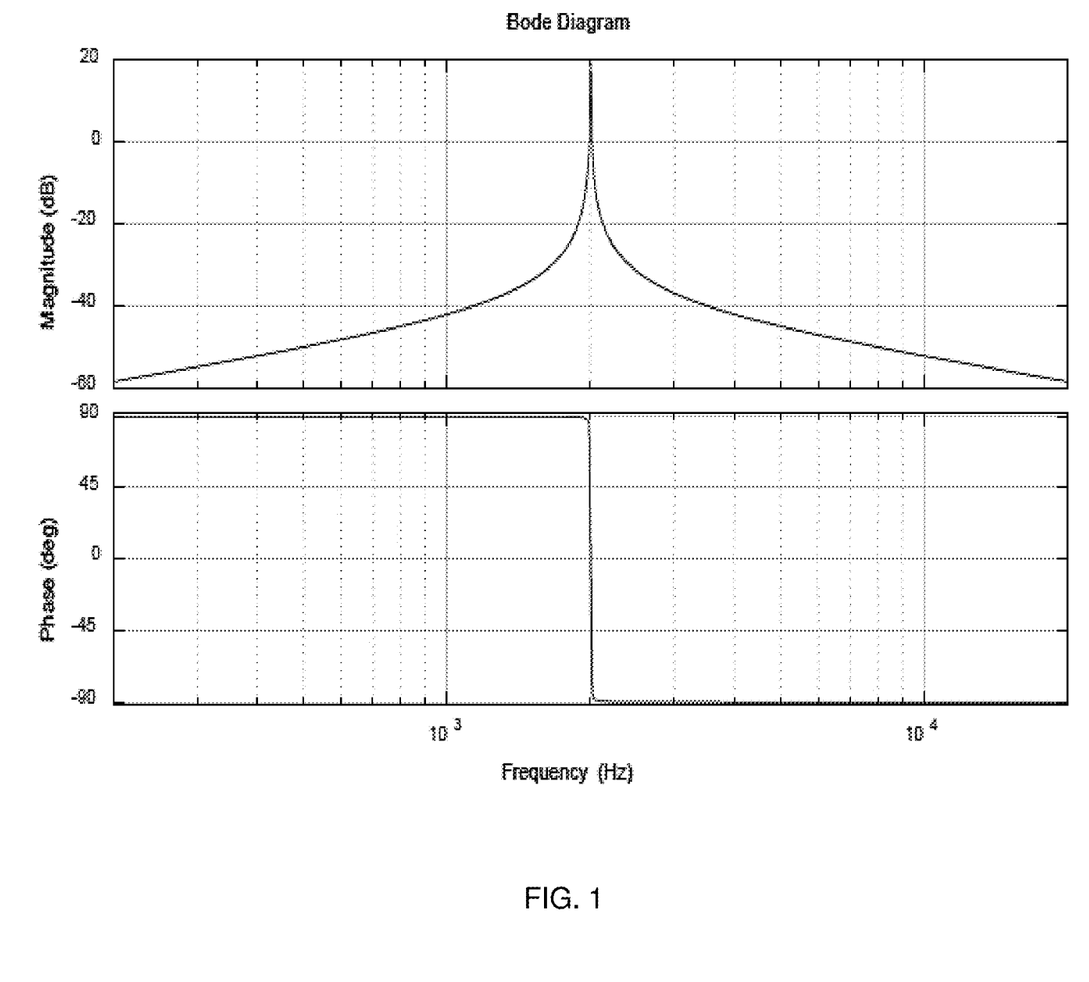
FIG. 1 is a bode plot of a harmonic regulator.

Active compensation for distortions can be programmed at multiples of the fundamental frequency (i.e. 400 Hz for a constant frequency aircraft electrical power system). The controller may be used to reduce distortion at the $3^{rd}$, $5^{th}$, $7^{th}$, $9^{th}$, $11^{th}$, and $13^{th}$ harmonics of the fundamental frequency. A harmonic regulator is well-suited for harmonic distortion compensation of aircraft variable speed constant frequency (VSCF) converters, since the output frequency is fixed at 400 Hz. A transfer function for each harmonic regulator can be expressed by Equation 1 below:

$$HR(s) = \frac{2\zeta\omega_0 k * s}{s2 + 2\zeta * s + \omega_0^2} \quad \text{(Eq. 1)}$$

where $\omega_0$ is the resonant frequency; $\zeta$ is the damping factor; and k is the peak gain. An example bode plot for a 2000 Hz harmonic regulator with a peak gain of 10 and damping factor of 0.001 is shown in FIG. 1. It is noted that at frequencies approaching 0, the transfer function phase asymptotically approaches 90 degrees of lead, whereas at frequencies approaching infinity the phase lead asymptotically approaches 90 degrees of lag. To reject disturbance at a given harmonic frequency, a large gain at the controller resonance frequency (which is matched to the harmonic frequency to be controlled) is desired. A low value of damping is used such that the gain rolls off very quickly away from the desired control frequency. Higher values of damping broaden the bandwidth of the controller increasing its response speed, however, higher values also increase gain outside of the control band which is not desired. Due to low damping, phase shifts very quickly from nearly 90 degrees leading to nearly 90 degrees lagging in proximity to the resonant frequency.

Figure 2:
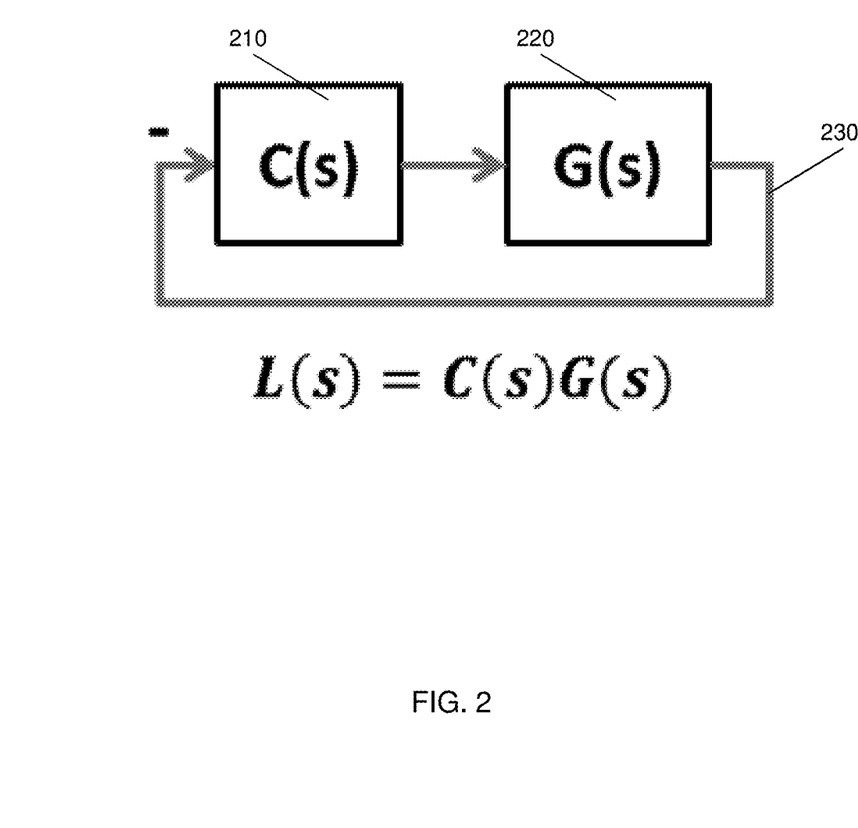
FIG. 2 is a simplified block diagram of a feedback-controlled dynamic system, depicting the system loop gain L(s), wherein C(s) is the compensator transfer function and G(s) is the transfer function of the plant being controlled.

As shown in FIG. 2, the system 200 includes loop gain L(s)=C(s)×G(s). The transfer function C(s) 210 of the controller and transfer function G(s) 220 of the plant being controlled are shown. The system 200 provides the output of G(s) 230 as negative feedback to the input of the controller transfer function C(s) 210.

For stability, the loop gain L(s) (which is the product of C(s) and G(s)) is assessed for phase margin and gain margin. It is common for the plant to induce a destabilizing phase lag which increases with frequency. This phase lag will occur due to instrumentation, discrete system effects, filter impedance effects, and load impedance effects. In the presence of harmonic regulators it is common for this to result in negative phase margin (e.g., instability) at some frequencies (particularly higher frequencies). Therefore, control of some frequencies may not be possible without modification.

Figure 3:
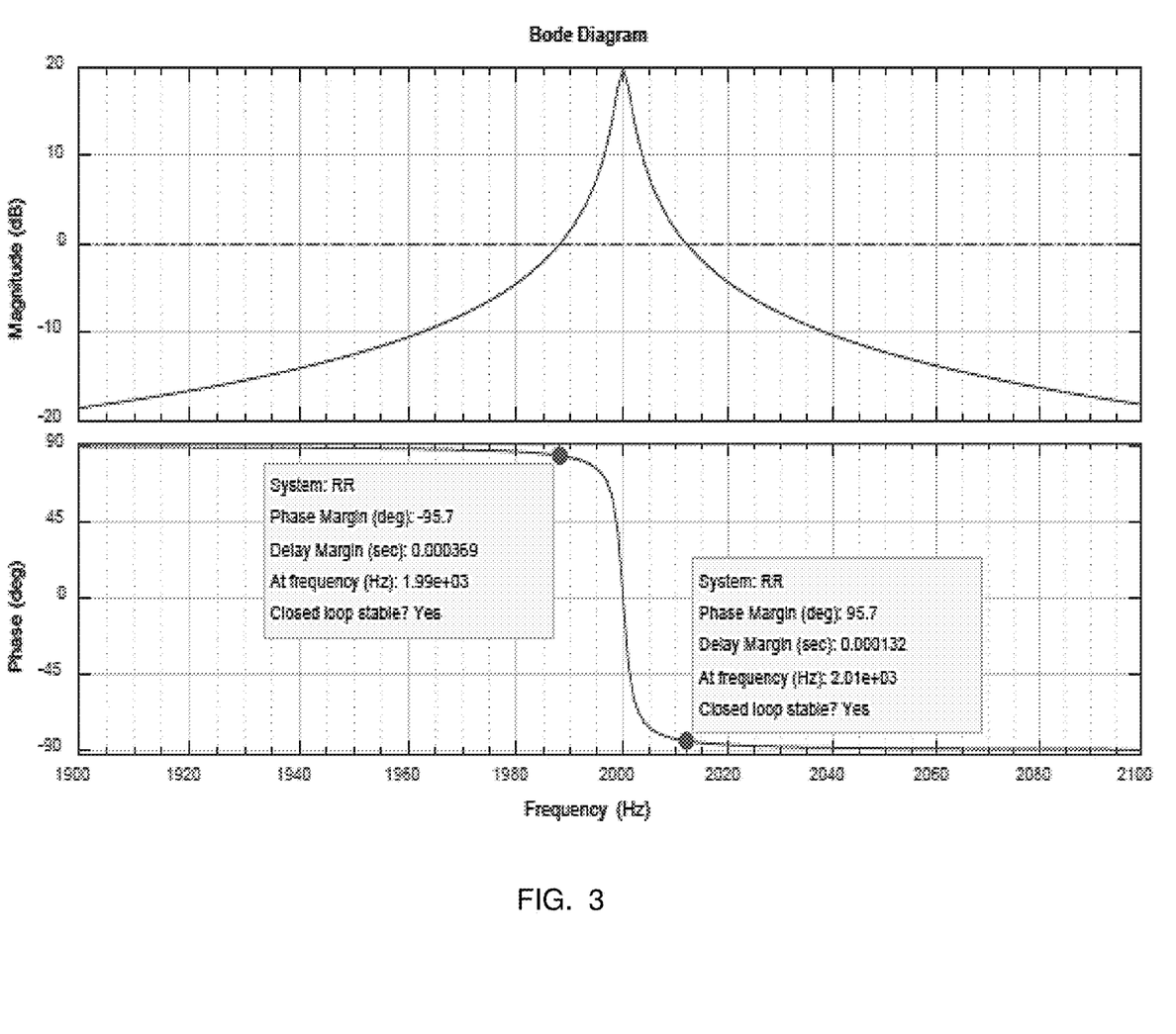
FIG. 3 depicts a phase margin of the system shown in FIG. 2, wherein C(s) is the transfer function depicted in the FIG. 1 bode plot, and G(s) is unity.

If the controller has the same transfer function displayed in FIG. 1, and a plant transfer function G(s)=1, then the system 200 will be stable as shown in FIG. 3. As provided in FIG. 3, the bode plot depicts 95.7 degrees of additional phase lead before the phase at the first crossover frequency exceeds +180 degrees, and 95.7 degrees of additional phase lag may be added before the phase at the second crossover frequency decreases below −180 degrees.

Figure 4:
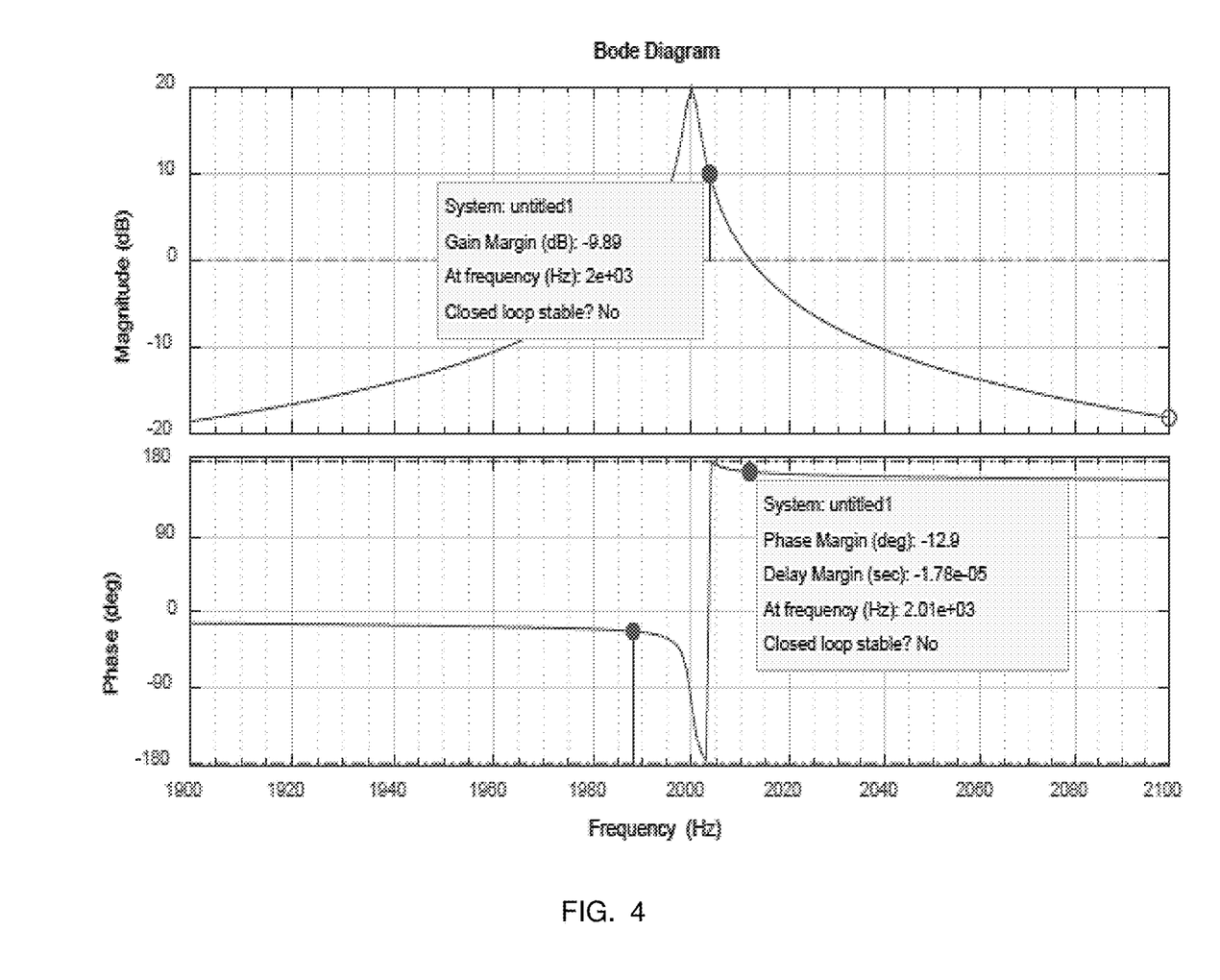
FIG. 4 depicts the gain and phase margin of the system shown in FIG. 2, wherein C(s) is the transfer function depicted in the FIG. 1 bode plot, and G(s) is a 150 µs delay.

Referring to system of FIG. 1, assume 150 µs delay is introduced due to sampling effects, that is $G(s)=e^{-s*0.00015}$. The resultant bode plot of the loop transfer function is now shown in FIG. 4. The system is now unstable since the phase delay at the second crossover frequency decreases below −180. This limits the ability of harmonic regulators to be used for VSCF power quality improvements.

The techniques described herein are for a method and controller for compensating loop transfer function delays that would otherwise make a harmonic regulator unstable or have decreased performance. The techniques described herein provide for modifying a controller from having only a harmonic regulator transfer function to having a time delay inserted before or after the harmonic regulator to achieve stability and thus improve the power quality.

Figure 5:
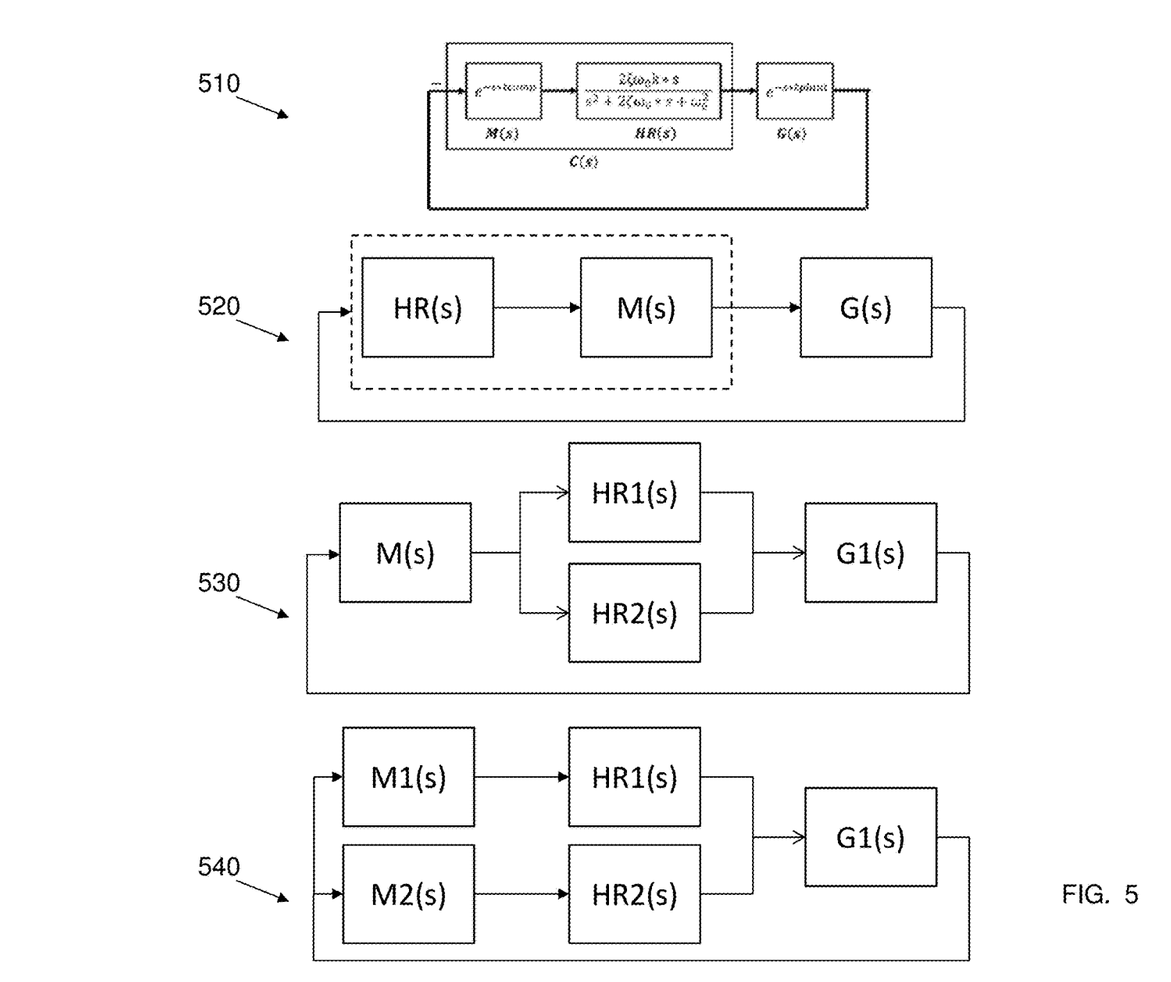
FIG. 5 depicts a harmonic regulator with delay compensation in accordance with one or more embodiments.

Now referring to FIG. 5, a block diagram of a controller 500 implementing delay compensation in accordance with one or more embodiments is shown. As shown, the controller includes a harmonic regulator transfer function HR(s), and a time delay M(s). In some embodiments, the time delay can be inserted before the harmonic regulator. In other embodiments, the time delay can be inserted after the harmonic regulator.

The harmonic regulator HR(s) has very narrowband performance, therefore it is only able to act on error that is periodic at the controller resonant frequency (or very close to the resonance frequency). Since the error is periodic, known delay in the plant can be compensated by adding even more delay to the loop, such that the total loop delay is equal to an integer number of control frequency periods. In this example, M(s) is equal to $e^{-2*tcomp}$ and G(s) is set equal to $e^{-2*tplant}$.

Other configurations including 510 are shown but achieve benefits of the aforementioned configuration. System 520 provides the loop delay M(s) is coupled to the output of the harmonic regulator HR(s). System 530 provides a single loop delay M(s), coupled to multiple harmonic regulators HR1(s) and HR2(s). System 540 provides separate loop delays M1(s) and M2(s) coupled to multiple harmonic regulators HR1(s) and HR2(s), respectively. It should be understood that other configurations can be implemented to improve the power quality of a system and are not limited by the examples shown in FIG. 5.

The loop delay can be set equal to n/resonance frequency component. Equation 2 provides the following:

$$\text{loop delay} = t\text{comp} + t\text{plant} \quad \text{(Eq. 2)}$$

where tcomp—added delay; tplant—system (plant) delay. In a non-limiting example, for a 2000 Hz component, the harmonic regulator will be stable if the loop delay is n/(2000) seconds, where n is an integer. Assuming that we want to control several harmonics of 400 Hz, in addition to 2000 Hz, the loop delay is set to ¼₀₀ or 0.0025 seconds. If the system delay tplant is known to be 150 µs, solving for tcomp results in a desired added delay of 0.00235 seconds.

Figure 6:
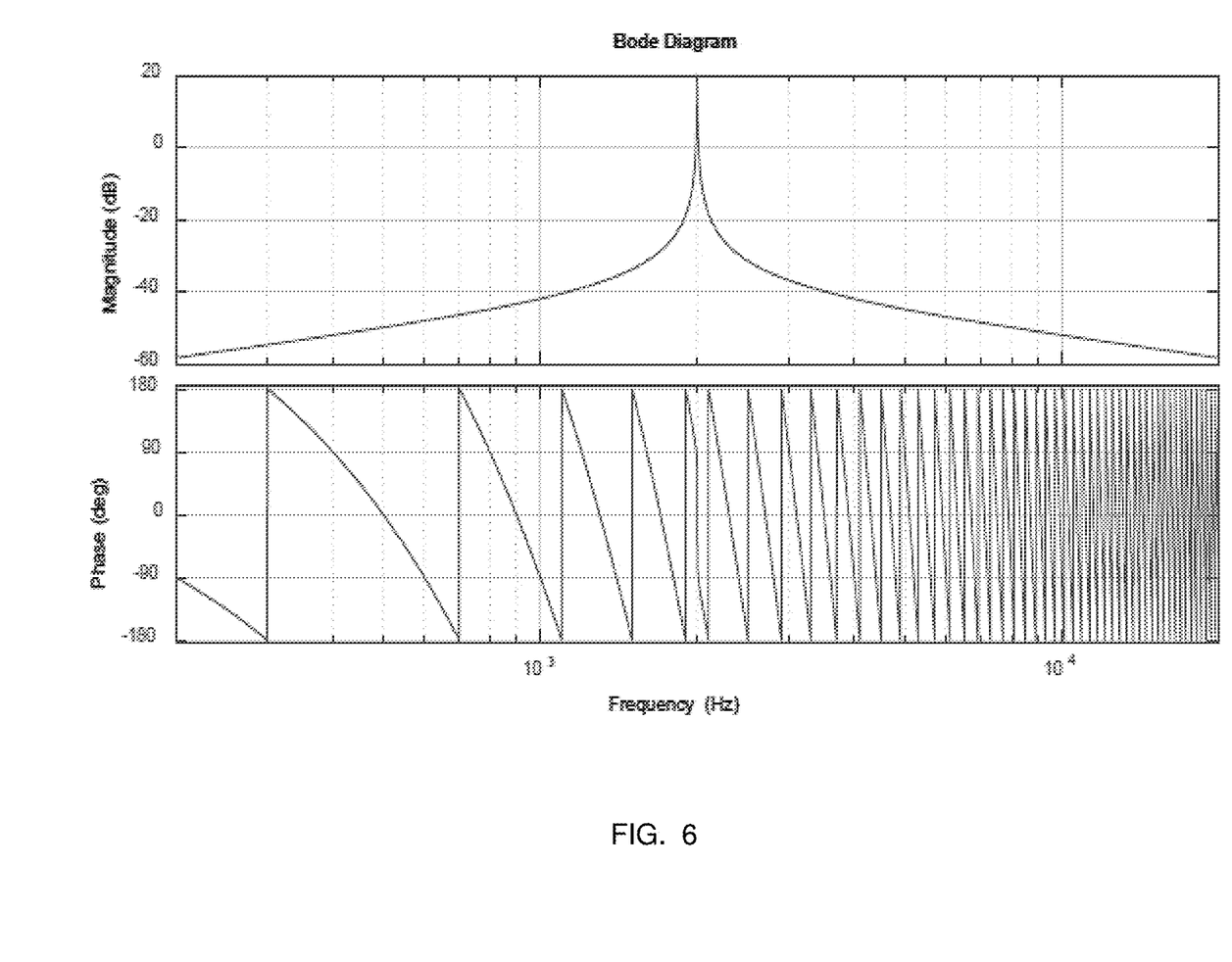
FIG. 6 depicts a bode plot for a harmonic regulator with delay compensation in accordance with one or more embodiments.
Figure 7:
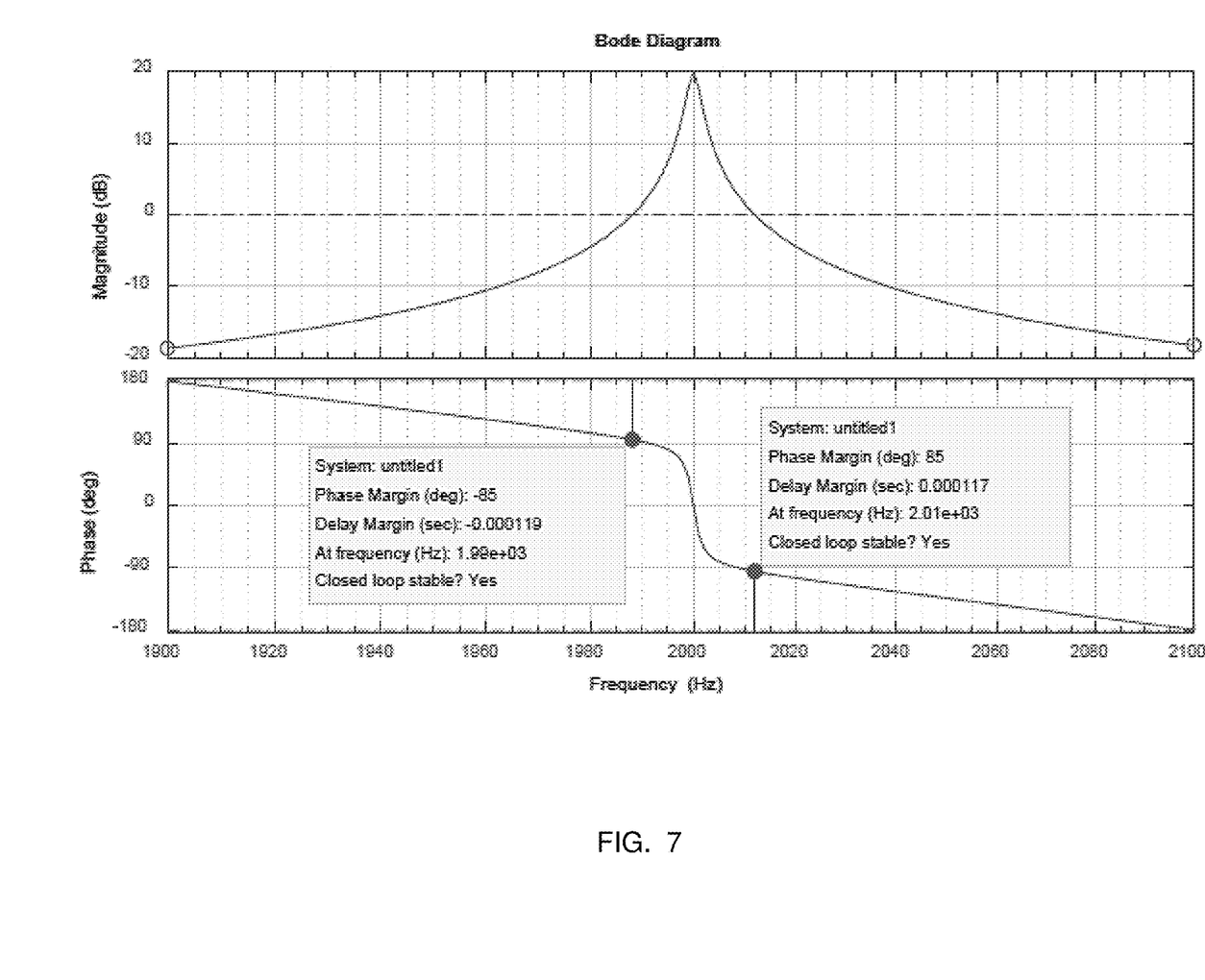
FIG. 7 depicts the bode plot of FIG. 6, between 1900 Hz and 2100 Hz, with phase margin shown in accordance with one or more embodiments.

The resulting bode plots of the loop gain with an added 0.00235 second delay are shown in FIGS. 6 and 7. The magnitude of the gain is greater than 1 near 2000 Hz so the phase margin only needs to be assessed at the gain crossover frequencies just above and below 2000 Hz. FIG. 6 illustrates a bode plot for the system of FIG. 5 where the controller incorporates the added time delay into the system to improve the phase margin of the system.

FIG. 7 illustrates a scaled view of the bode plot of FIG. 6. Due to the added loop delay M(s), there is now 85 degrees of phase margin at the upper and lower unity gain crossover frequencies. Therefore, the system is now stable. In one or more embodiments, the loop delay is observed during the operation of the system. The measured delay is used to select an added tcomp compensation delay.

Other factors that can cause variations in the system gain and cause phase delays that do not linearly increase with frequency include the output filter, output load, and instrumentation. For such systems, the harmonic regulator gain, k, may be varied to set the desired gain at each harmonic. Additionally, the value of tcomp used for each harmonic may be separately tuned to account for nonlinear phase characteristics in the system such as shown in configuration 540 of FIG. 5. In some embodiments, the controller may be implemented in a digital control system. The controller transfer functions are designed in continuous time and then converted to discrete time. The time delays are then added by incorporating the proper number of sample delays in discrete time.

In one or more embodiments, the results can be provided to an operator and display in graphical or textual representation representing the performance of the system. In some embodiments, the results can be transmitted to another system, remote and/or local, for further analysis.

Figure 8:
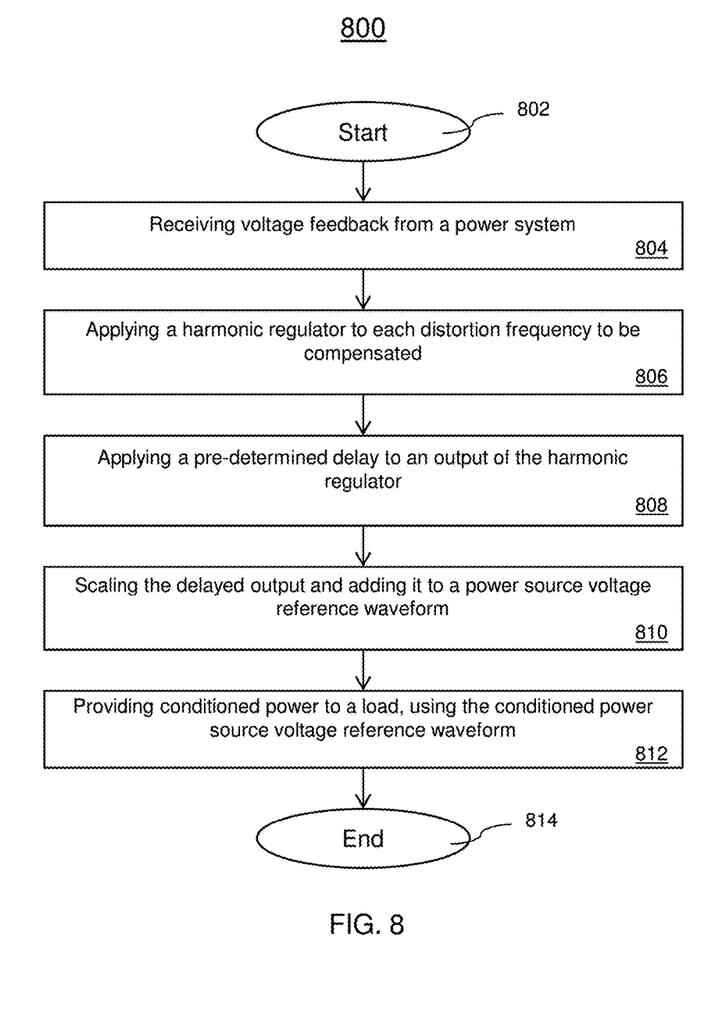
FIG. 8 depicts a flowchart of a method for implementing a harmonic regulator with delay compensation in accordance with one or more embodiments.

Now referring to FIG. 8, a flowchart of a method 800 for implementing a harmonic regulator with delay compensation is shown. The method 800 begins at block 802 and proceeds to block 804 which provides for receiving, at a controller, voltage feedback from a power system. Block 806 provides for applying a harmonic regulator to each distortion frequency under control and proceeds to block 808 which applies a pre-determined delay to the control signal. The method 800 at block 810 provides for scaling the delayed compensator waveform output 808 and adding it to the power source voltage reference waveform. Block 812 provides the conditioned power to a load, using the conditioned power source voltage reference waveform output of block 810. The method 800 ends at block 814. It is to be understood the method 800 can be continuously repeated. In addition, the method 800 can include one or more steps of 804-812 or different and/or additional steps and is not limited by the steps provided above.

Figure 9:
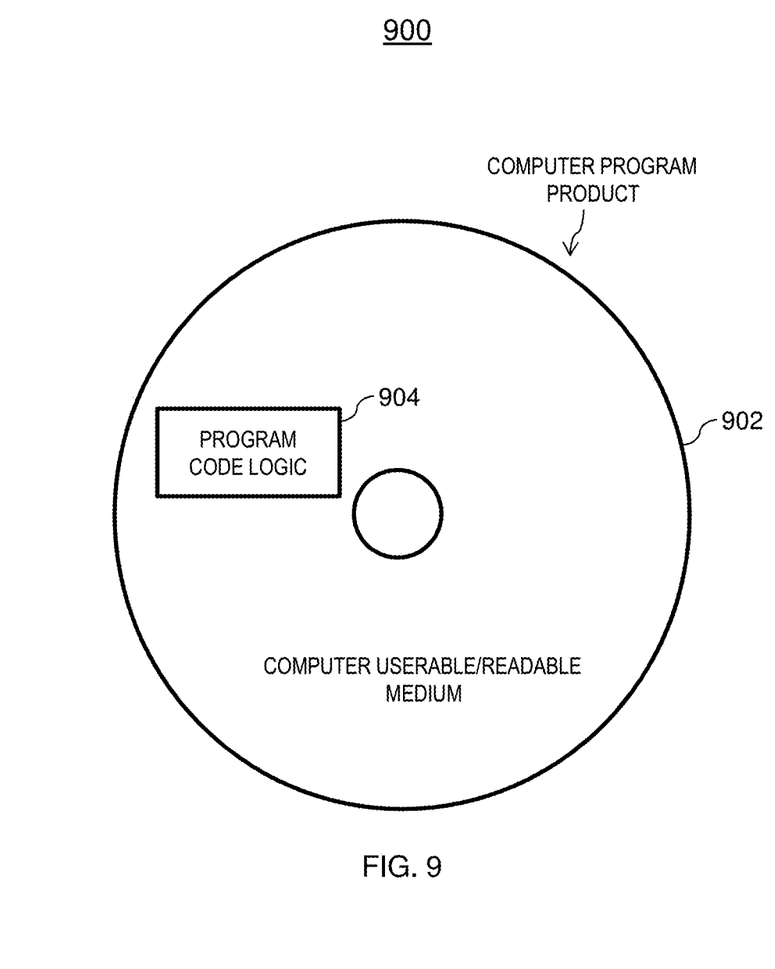
FIG. 9 depicts a computer program product in accordance with one or more embodiments.

Referring now to FIG. 9, a computer program product 900 in accordance with an embodiment that includes a computer-readable storage medium 902 and program instructions 904 is generally shown.

The technical effects and benefits include implementing delay compensation which enables control and reduction of harmonic distortions at frequencies which otherwise could not be controlled with harmonic regulators. The technical effects and benefits also include a reducing the system voltage distortion in the presence of non-linear loads. Also, the line-replaceable unit (LRU) weight is reduced due to decreased LRU power rating required to maintain system voltage distortion within acceptable limits.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for implementing a harmonic regulator with loop delay compensation comprising:
    a power system; and
    a controller coupled to the power system, wherein the controller is coupled to the power system and further comprises:
        a harmonic regulator configured to remove distortion from power provided by the power system;
        a delay component configured to add delay to the power from the power system, wherein an output of the controller is provided to a load and provided as feedback to an input of the controller.

2. The system of claim 1, wherein the delay component is coupled to an input of the harmonic regulator.

3. The system of claim 1, wherein the delay component is coupled to an output of the harmonic regulator.

4. The system of claim 1, wherein the delay component is based at least in part on an integer number of sample delays in discrete time based on the control frequency.

5. The system of claim 1, wherein the harmonic regulators include a plurality of harmonic regulators and the delay components include a plurality of delay components, wherein the plurality of harmonic regulators are coupled to a corresponding a delay component of the plurality of delay components.

6. The system of claim 1, wherein gain for the harmonic regulator is independently selected.

7. The system of claim 1, wherein the delay component is coupled to a plurality of harmonic regulators.

8. A computer-implemented method for operating a harmonic regulator with loop delay compensation, the computer-implemented method comprising:
    receiving, at a controller, voltage feedback from a power system;
    applying a harmonic regulator to each distortion frequency to be compensated;
    applying a predetermined delay to an output of the harmonic regulator;
    scaling the delayed output and adding it to a power source voltage reference waveform; and
    providing condition power to a load, using the conditioned power source voltage reference waveform.

9. The computer-implemented method of claim 8, wherein the pre-determined delay component is coupled to an input of the harmonic regulator.

10. The computer-implemented method of claim 8, wherein the pre-determined delay component is coupled to an output of the harmonic regulator.

11. The computer-implemented method of claim 8, wherein the pre-determined delay component is based at least in part on an integer number of sample delays in discrete time based on the control frequency.

12. The computer-implemented method of claim 8, wherein the harmonic regulator includes a plurality of harmonic regulators and the delay components include a plurality of delay components, wherein the plurality of harmonic regulators are coupled to a corresponding delay component of the plurality of delay components.

13. The computer-implemented method of claim 8, further comprising individually selecting a gain for each harmonic regulator.

14. The computer-implemented method of claim 8, wherein the pre-determined delay component is coupled to a plurality of harmonic regulators.

15. A controller for implementing a harmonic regulator with loop delay compensation, the controller comprising:
    a storage medium, the storage medium being coupled to a processor;
    a controller coupled to a power system, wherein the controller is coupled to the power system and further comprises:
        a harmonic regulator configured to remove distortion from power provided by the power system;
        a delay component configured to add delay to the power from the power system, wherein an output of the controller is provided to a load and provided as feedback to an input of the controller.

16. The controller of claim 15, wherein the delay component is coupled to an input of the harmonic regulator.

17. The controller of claim 15, wherein the delay component is coupled to an output of the harmonic regulator.

18. The controller of claim 15, wherein the delay component is based at least in part on an integer number of sample delays in discrete time based on the control frequency.

19. The controller of claim 15, wherein the harmonic regulators include a plurality of harmonic regulators and the delay components include a plurality of delay components, wherein the plurality of harmonic regulators are coupled to a corresponding a delay component of the plurality of delay components.

20. The controller of claim 15, wherein the delay component is coupled to a plurality of harmonic regulators.

* * * * *